US005404438A

United States Patent [19]

Kennedy et al.

[11] Patent Number: 5,404,438

[45] Date of Patent: Apr. 4, 1995

[54] METHOD AND APPARATUS FOR OPERATING TEXT MODE SOFTWARE IN A GRAPHICS MODE ENVIRONMENT

[75] Inventors: John R. Kennedy, Tomball, Tex.; Kenshiro Ando, Tokyo, Japan

[73] Assignee: Compaq Computer Corporation, Houston, Tex.

[21] Appl. No.: 846,004

[22] Filed: Mar. 3, 1992

[51] Int. Cl.[6] .............. G06F 15/62

[52] U.S. Cl. .............. 395/154

[58] Field of Search .............. 395/145, 147, 162, 164, 395/154; 345/185, 189, 190, 192, 193, 194, 195

[56] References Cited

U.S. PATENT DOCUMENTS

| | | | |
|---|---|---|---|
| 4,622,546 | 11/1986 | Sfarti et al. | 340/748 |
| 4,651,146 | 3/1987 | Lucash et al. | 340/721 |
| 4,823,108 | 4/1989 | Pope | 340/721 |
| 4,926,322 | 5/1990 | Stimac et al. | 364/200 |
| 5,237,669 | 8/1993 | Spear et al. | 395/400 |

FOREIGN PATENT DOCUMENTS 2-3099 8/1990 Japan .

OTHER PUBLICATIONS

Desqview Version 2.4 Manual, Copright Dec. 1991, representing software program "Desqview" by Quarterdeck Office Systems.

IBM Technical Disclosure Bulletin, vol. 31, No. 6, Nov. 1988, "New Character Mode For High Frequency Display," p. 59.

PCT International Research Report for PCT/US 97/01772, the PCT counterpart to this application.

James L. Turley, *Advanced 80386 Programming Techniques,* Osborne McGraw-Hill (1988).

*Primary Examiner*—Robert W. Beausoliel, Jr.

*Assistant Examiner*—Stephen C. Elmore

*Attorney, Agent, or Firm*—Pravel, Hewitt, Kimball & Krieger

[57] ABSTRACT

A method and apparatus which allows U.S. software applications which write directly to the video text RAM area to run in a purely graphics mode operating system environment such as Japanese mode of DOS/V. Memory management software includes an option which reserves main memory at system initialization for receiving the text RAM area in IBM PC compatible systems. A software driver periodically checks to determine if anything has changed in the text RAM area using the "dirty" bits associated with the page table entries in the 386 paging mechanism. If new data has been written to this area, the driver converts the ASCII data written to this area to graphics based characters which are then displayed onto the computer screen.

8 Claims, 5 Drawing Sheets

METHOD AND APPARATUS FOR OPERATING TEXT MODE SOFTWARE IN A GRAPHICS MODE ENVIRONMENT

FIELD OF THE INVENTION

The present invention relates to software compatibility in computer systems, and more particularly to a method for allowing text mode-based software to operate properly in a purely graphics mode operating environment.

DESCRIPTION OF THE RELATED ART

Personal computer systems compatible with those originally developed by International Business Machines Corp. (IBM) include two video modes: text mode and graphics mode. In text mode, the computer video screen can only show the ASCII character set, which comprises 256 characters. The computer screen is divided into specific character positions, one standard format being 80 columns of characters across the width of the screen and 25 lines of characters from top to bottom. In graphics mode, the screen is treated as a 2-dimensional array of pixels (picture elements), and images that appear on the screen are displayed by using a combination of pixels. In IBM-compatible computer systems, the memory block from address A0000H to BFFFFH is reserved for video memory. The memory map is organized such that the monochrome text mode buffer begins at address B0000H, the color text mode buffer begins at B8000H, and the graphics mode buffer begins at address A0000H.

IBM-compatible personal computers include built-in services referred to as the ROM-BIOS services. One service provided by the ROM-BIOS is that of interfacing between software applications and the video controller and video RAM. The video ROM-BIOS services are stored in ROM (read only memory) inside the computer system and can be accessed through an INT 10 instruction. However, most United States software applications do not use these video ROM-BIOS services but instead write directly to the video text RAM area. This is primarily because previously the ROM-BIOS services were stored in 8 bit ROM chips and thus using these services was considerably slower than writing directly to the video RAM. Although techniques have recently been developed to copy the BIOS from ROM to much faster RAM, the majority of current U.S. software applications have been designed to bypass the video ROM-BIOS services and write directly to the video RAM.

Japanese computer systems utilize a version of DOS referred as DOS/V (Japanese DOS). Due to the intricacies and complexities of the Japanese character set, DOS/V includes two operating modes, a U.S. mode and a Japanese mode. In U.S. mode, DOS/V includes both text mode and graphics mode capabilities like the American versions of DOS, and thus U.S. application software can operate under DOS/V in U.S. mode. DOS/V in Japanese mode operates only in graphics mode and does not include a text mode. This is because the various characters in the Japanese character set may only be realistically generated in graphics mode. For example, the Japanese kanji character set includes between 7,000 and 8,000 characters, and thus utilizing a text mode to generate each of these characters would be impractical. Because DOS/V in Japanese mode does not include a text mode, DOS/V in Japanese mode is incapable of running U.S. software applications which operate in text mode.

If all U.S. software applications accessed the video RAM through the ROM-BIOS services, then it would be a relatively simple procedure to trap the INT 10 instruction and have a software routine display the desired text data onto the screen in graphics mode. However, as previously mentioned, the majority of U.S. software applications do not use the video BIOS services. Thus, the vast majority of U.S. applications cannot execute under DOS/V in Japanese mode, but rather must be executed in U.S. mode.

The procedure of switching DOS/V from Japanese mode into U.S. mode is generally cumbersome and undesirable. This is especially true for TSR (terminate and stay resident) programs because, if the user were required to exit his application and switch modes in order to execute the TSR, the "hot key" benefits of the TSR would be wasted. Therefore, a method is desired which enables application software which writes directly to the video RAM text area to operate properly in the Japanese mode of DOS/V.

Background on the Intel 80386 processor and memory management software is deemed appropriate. The 80386 processor includes a memory management unit (MMU) which translates logical addresses defined by either segments and offsets or segment descriptor tables into linear addresses and includes memory paging hardware which maps linear addresses into physical addresses. Memory paging requires two kinds of tables: page directories and page tables. These tables are made up of 32 bit descriptors. The page table descriptor includes a bit referred to as the "dirty" bit. The dirty bit is automatically set by the processor whenever the page frame which the respective descriptor covers is written into. For more information on the 80386 and its paged memory system, please see James L. Turley "Advanced 80386 Programming Techniques," Copyright 1988, McGraw-Hill, Inc. pp. 117–163, which is hereby incorporated by reference.

SUMMARY OF THE INVENTION

The present invention comprises a method and apparatus which allows U.S. software applications which write directly to the video text RAM area to run in a purely graphics mode operating system environment such as the Japanese mode of DOS/V. The preferred embodiment comprises a text/graphics conversion software driver that works in conjunction with memory management software. The memory management software includes a user selectable option which reserves memory at system initialization that can be used later as the text RAM area. Thus, when a computer system is running DOS/V in Japanese mode and this option is selected, the memory management software allocates main memory for the text RAM area for U.S. text-based software applications.

The software driver is hooked into the timer tick interrupt. Periodically, i.e., at every interrupt, the driver asks the memory management software if anything has been written to the newly created text RAM area since the last interrupt. As discussed in the background, the 386 paging mechanism provides a "dirty" bit for each 4 k page which indicates whether anything has been written to that page since the last time the bit was cleared. The memory management software is responsible for maintaining these page tables. Thus, by checking the dirty bits corresponding to the pages allocated for the video text 2RAM area and also clearing these bits at each interrupt, the memory management software can quickly determine whether new data has been written to the text RAM area.

If new data has been written to this area, the software driver takes the ASCII characters written to this area and converts them to graphics based characters comprised of pixels, which are then displayed onto the computer screen. If all of the respective dirty bits are cleared, indicating that no ASCII characters have been written to the text RAM area, then no action is taken. The software driver repeats this operation at each timer tick interrupt.

When a user switches to U.S. mode, the video text RAM area is occupied by genuine video text RAM, and the driver instructs the memory management software to disable RAM mapping to this location.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE SPECIFIC EMBODIMENT

Figure 1:
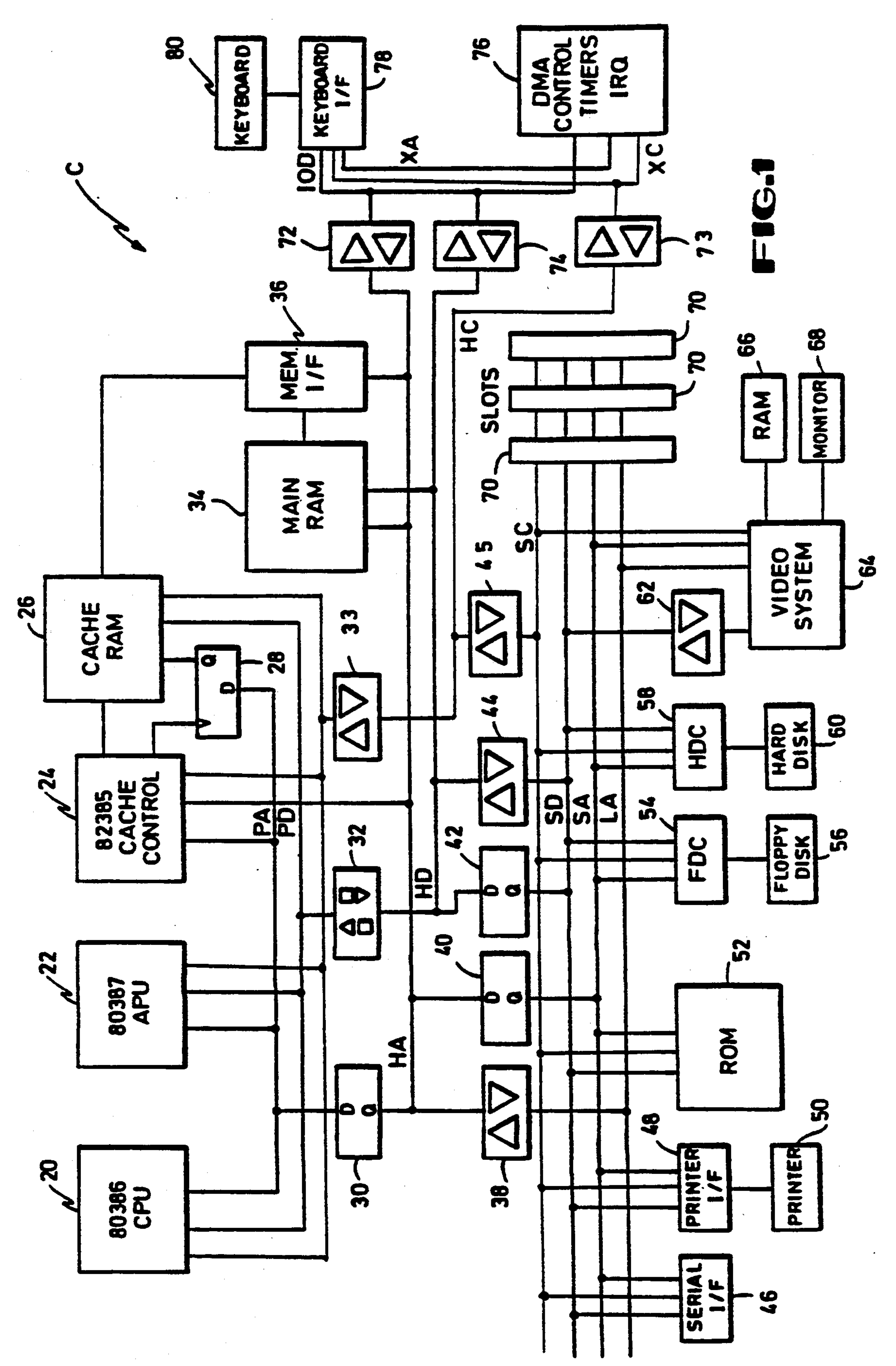
FIG. 1 illustrates a computer system incorporating the present invention.

Referring now to FIG. 1, the letter C generally represents a computer incorporating the present invention. The computer system disclosed below is illustrative only, it being noted that the present invention can be incorporated into varying types of computer systems. A number of different blocks are used in the computer system C. The microprocessor 20 used is preferably an 80386 microprocessor manufactured by Intel Corporation (Intel). The microprocessor 20 has an address bus PA, a data bus PD, and a control bus PC, these buses PA, PD and PC being referred to as the local bus. Coupled to the local bus are an arithmetic processing unit or numerical coprocessor 22, preferably an 80387 manufactured by Intel; a cache controller 24, preferably an 82385 manufactured by Intel; cache RAM 26; and an address latch 28. The cache controller 24 cooperates with the cache RAM 26 to provide the necessary control to handle a cache system in the computer system C. The local bus is connected to an intermediate bus by means of a latch 30, which connects the local address bus PA to an intermediate address bus HA. A latched transceiver 32 connects the local data bus PD to an intermediate data bus HD. A transceiver 33 connects the local control bus PC to an intermediate control bus HC. Alternatively, an Intel Corp. 80486 processor can be used, replacing the 80386 CPU 20, 80387 numeric coprocessor 22 and possibly also the 82385 cache controller 24 and cache RAM 26.

Main memory 34 and a memory interface 36 are connected to the intermediate bus. The main memory 34 includes an operating system which includes a mode wherein a video controller 64 operates solely in graphics mode, i.e., does not include a text mode. Preferably, the operating system is DOS/V (Japanese DOS) running in Japanese mode. The main memory 34 also includes memory management software and a text/graphics conversion driver according to the present invention which enables software applications that write directly to the video RAM text area to operate in conjunction with a computer system that operates solely in graphics mode and does not include a text mode.

Various other buses are developed from the intermediate bus. For example, intermediate address bus HA is coupled by a transceiver 38 to an early system address bus LA and by a latch 40 to a latched system address bus SA. The intermediate data bus HD is coupled by a latch 42 and transceiver 44 to the system data bus SD. The intermediate control bus HC is coupled by a transceiver 45 to the system control bus SC. Numerous devices are coupled to the system buses LA, SA, SD, and SC as are a series of slots 70 which are used for receiving interchangeable circuit boards which contain additional functions which can be utilized in the computer system C. A serial interface 46 is connected to the system data bus SD, the latched system address bus SA and the system control bus SC. A printer interface 48 is also connected to the system data bus SD, the latched system address bus SA, and the system control bus SC, with a printer 50 being attached to the printer interface 48. The read only memory (ROM) 52 which contains a portion of the operating software of the computer C is connected to the system data bus SD, the latched system address bus SA, and the system control bus SC. A floppy disk controller 54 is connected to the system data bus SD, the latched system address bus SA, and the system control bus SC. A floppy disk unit 56 which is used for providing storage for the computer system C is connected to the floppy disk controller 54. A hard disk controller 58 is connected to the system data bus SD, the latched system address bus SA, and the system control bus SC with a hard disk unit 60 being attached to the hard disk controller 58.

The video controller 64 which controls the presentation of data to the user is connected to the early system address bus LA, the latched system address bus SA, the system control bus SC, and coupled to the system data bus SD by means of a transceiver 62. The video controller preferably has two modes of operation, text mode and graphics mode. When DOS/V is operating in Japanese mode, the video controller 64 operates solely in graphics mode. Connected to the video controller 64 are the random access memory (RAM) 66 used to form the video memory and a monitor 68 which presents the desired display to the user.

Various other subsystems are coupled to the intermediate data, address and control buses, HD, HA and HC, respectively. A transceiver 72 is connected to the intermediate address bus HA and to an extended address bus XA. A transceiver 73 is connected to the intermediate control bus HC and to an extended control bus XC. A transceiver 74 is connected between the intermediate data bus HD and an input/output (I/O) data bus IOD. Connected to the extended address bus XA, the data bus IOD, and the extended control bus XC is a combined unit 76 which contains the DMA controller for the computer C, the interrupt controller, and a series of timers. A keyboard interface 78 is also connected to the extended address bus SA, the IO data bus IOD and the extended control bus XC. A keyboard 80 is connected to the keyboard interface 78 to allow the user to enter desired character sequences and commands.

This has been an exemplary computer system, and numerous other system designs can be used with the present invention.

Figure 4:
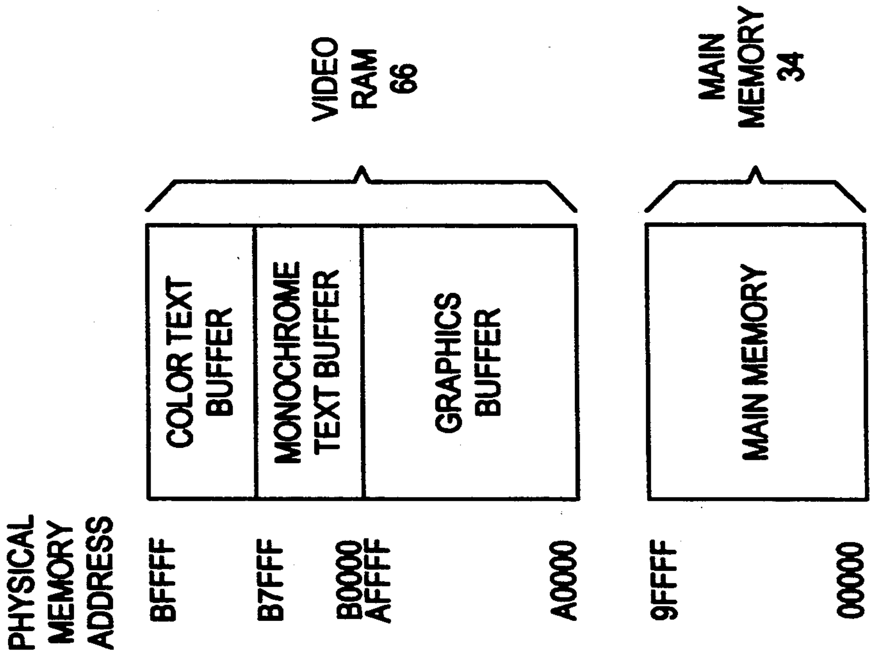
FIG. 4 illustrates a typical physical memory map of a computer system memory in which the invention would preferably be implemented.

The memory organization of the computer system C is preferably compatible with the memory organization of personal computers previously manufactured and sold by IBM. This memory organization is illustrated by the memory map shown in FIG. 4. However, the incorporation of the present invention into computer systems with other memory organizations is also contemplated. The 128 kbyte block of memory from memory address 0A0000H to memory address 0BFFFFH is reserved for the video RAM. When DOS/V is being used in U.S. mode, the block of memory from memory address from 0A0000H to 0AFFFFH is reserved for the graphics mode buffer, the block of memory from 0B0000H to 0B7FFFH is reserved for the monochrome text buffer, and the block of memory from 0B8000H to 0BFFFFH is reserved for the color text buffer. In Japanese mode, the 64 kbyte block from memory address 0A0000H to 0AFFFFH is reserved for the graphics mode buffer, and no text buffers are allocated.

As mentioned in the background, U.S. software applications which utilize text mode and write directly to the video memory previously could not operate in Japanese mode because the video controller 64 is configured for graphics mode only and no text buffer memory is allocated. Therefore, these software applications previously have been required to execute in U.S. mode. This causes inconvenience and delay because a user is forced to exit Japanese mode and enter U.S. mode before executing any U.S. software. This is especially problematic in TSR (terminate and stay resident) programs when a user attempts to "hot key" or invoke a TSR while in Japanese mode. If the TSR attempts to write ASCII characters to the monitor 68 by writing directly to the text RAM buffer, the ASCII data will either appear as garbled pixel data or will not appear at all. Therefore, in order to invoke a TSR, a user is required to exit his application, exit Japanese mode, and then enter U.S. mode to run the TSR. This essentially removes any benefits of having the TSR. The method disclosed below overcomes these problems and allows all U.S. software to operate in Japanese mode.

Figure 2A:
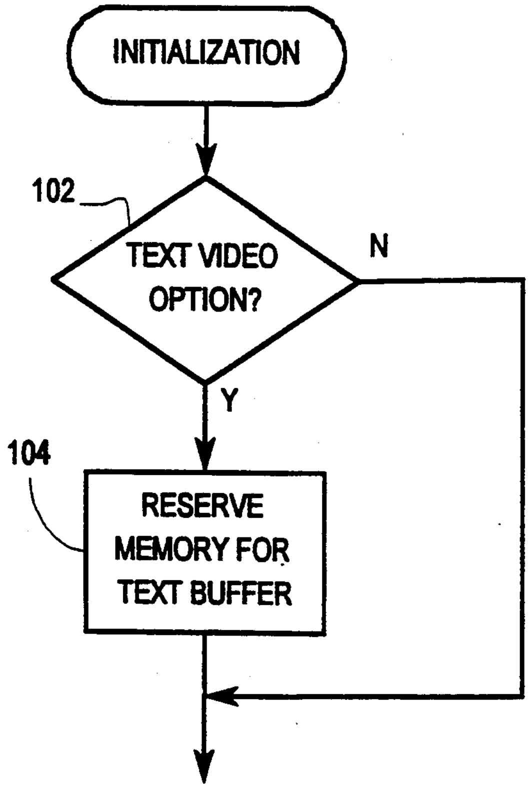
FIGS. 2A, 2B, and 3 are flowcharts illustrating operation of the present invention.
Figure 5:
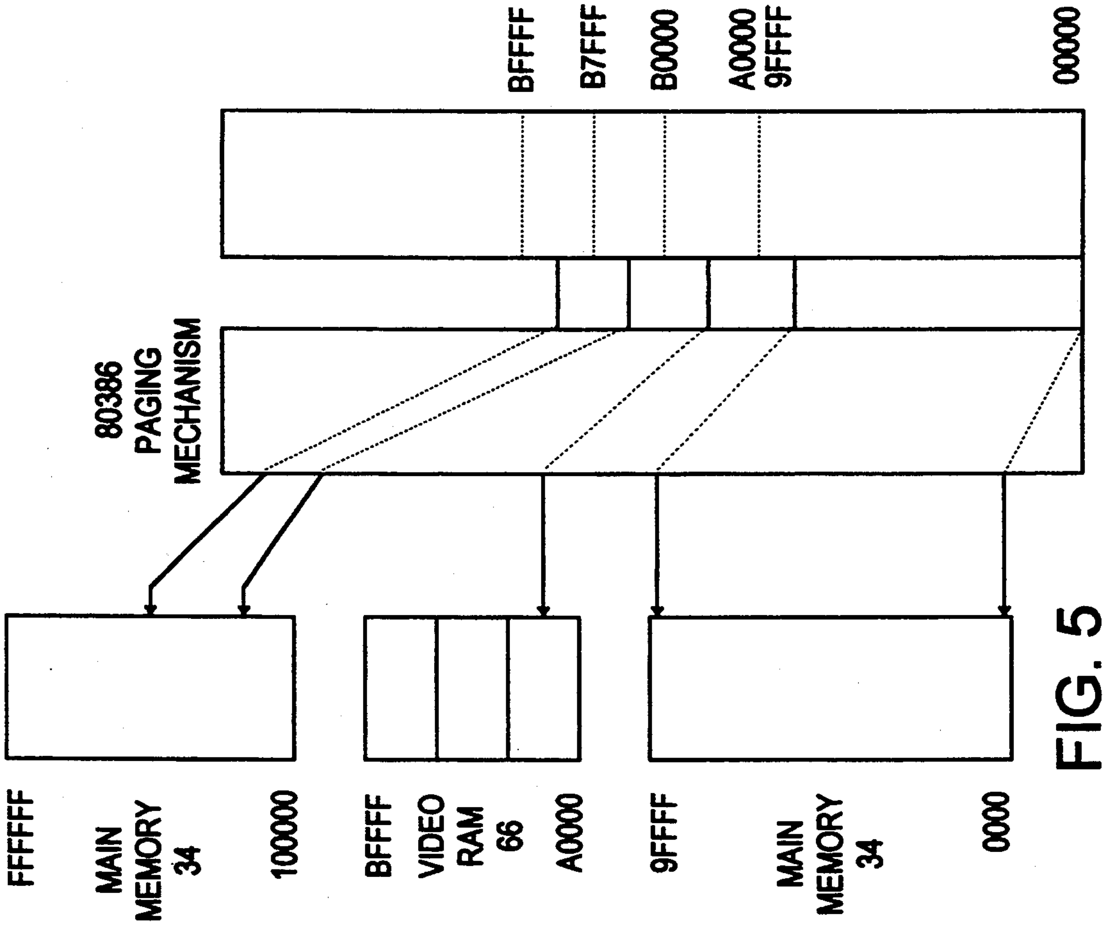
FIG. 5 illustrates the paging mechanism and mapping of video and main memory according to the invention.

Referring now to FIG. 2A, a flowchart diagram illustrating Operation of the memory management software at initialization is shown. During system initialization, the memory management software, such as an appropriately revised version of CEMM.EXE provided by Compaq Computer Corp., an early version of which is described in U.S. Pat. No. 4,926,322 to Stimac, which is hereby incorporated by reference, determines if an option referred to as the video text option is selected by a user in step 102. If so, then the memory management software reserves 32 kbytes of main memory 34 for a "pseudo" text RAM buffer in step 104. The memory management software preferably maps the processor internal addresses from 0B8000H to OBFFFFH, i.e., the color text buffer, to this reserved main memory 34. This remapping using the paging mechanism of the 80386 microprocessor is illustrated in FIG. 5. As can be seen, the color text buffer and monochrome text buffer have been remapped from their standard locations in the video memory 66 to main memory 34. The intricacies of this mapping mechanism are further illustrated in FIG. 6, which is further described in U.S. Pat. No. 4,926,322 to Stimac. It is noted that the reserved 32 kbytes of memory may also be mapped to the processor internal addresses from 0B0000H to 0B7FFFH if the software application utilizes the monochrome text mode. Thereafter, when the software application writes text data to the text buffer, the mapping performed by the memory management software writes this data to the 32 kbytes of reserved main memory. In this manner, the software application believes that it is operating in text mode. If the video text option is not selected by the user, then no memory is reserved for this purpose. In addition, if the video text option is selected and the user switches from Japanese mode to U.S. mode, then the memory management software disables the mapping of the processor addresses to the reserved main memory area because genuine text RAM in the video RAM 66 is allocated in U.S. mode. After steps 102 or 104, the routine proceeds to further initialize the computer system C at step 106.

Figure 3:
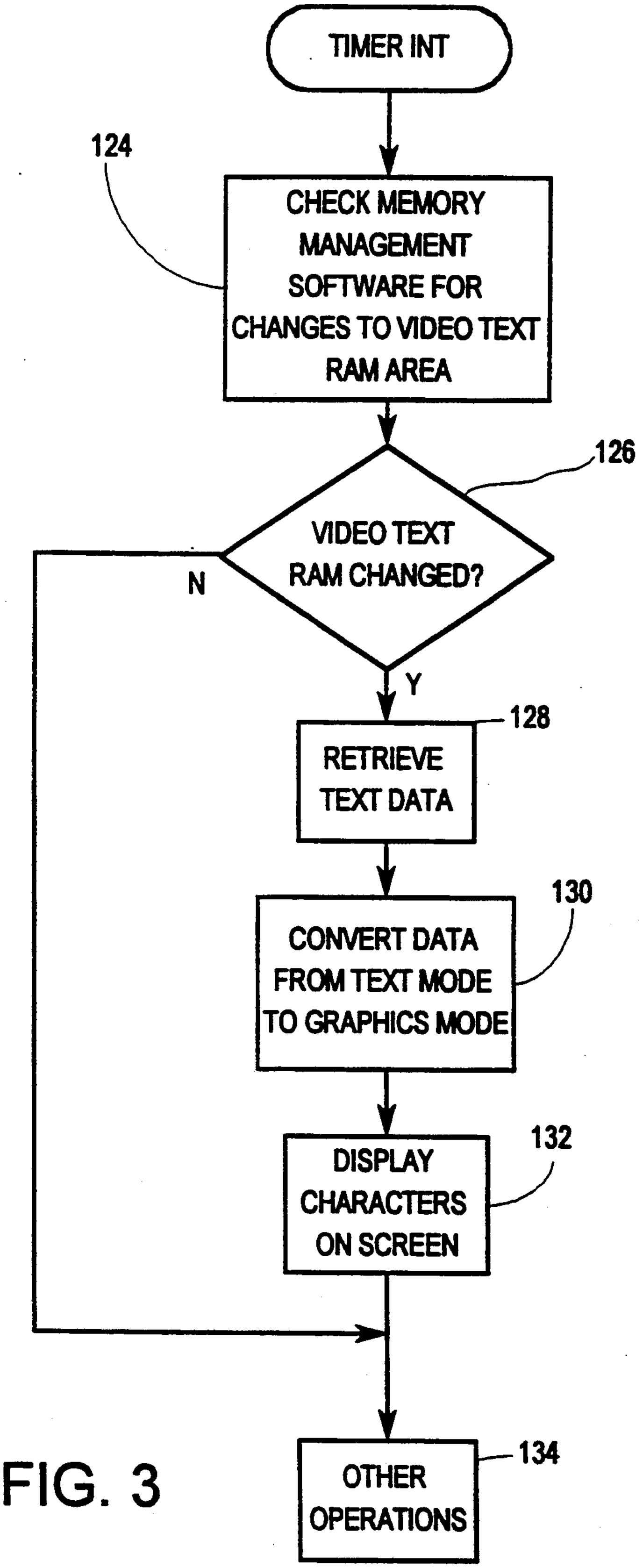

Referring now to FIG. 3, a flowchart diagram illustrating operation of the text/graphics conversion driver is shown. As previously mentioned, the driver is executed during each timer interrupt, as shown in step 122. When the timer interrupt is generated, the driver checks the memory management software in step 124 to determine if any changes have been made to the video text RAM area, i.e., if any writes have occurred to this area, since the last timer interrupt.

Figure 2B:
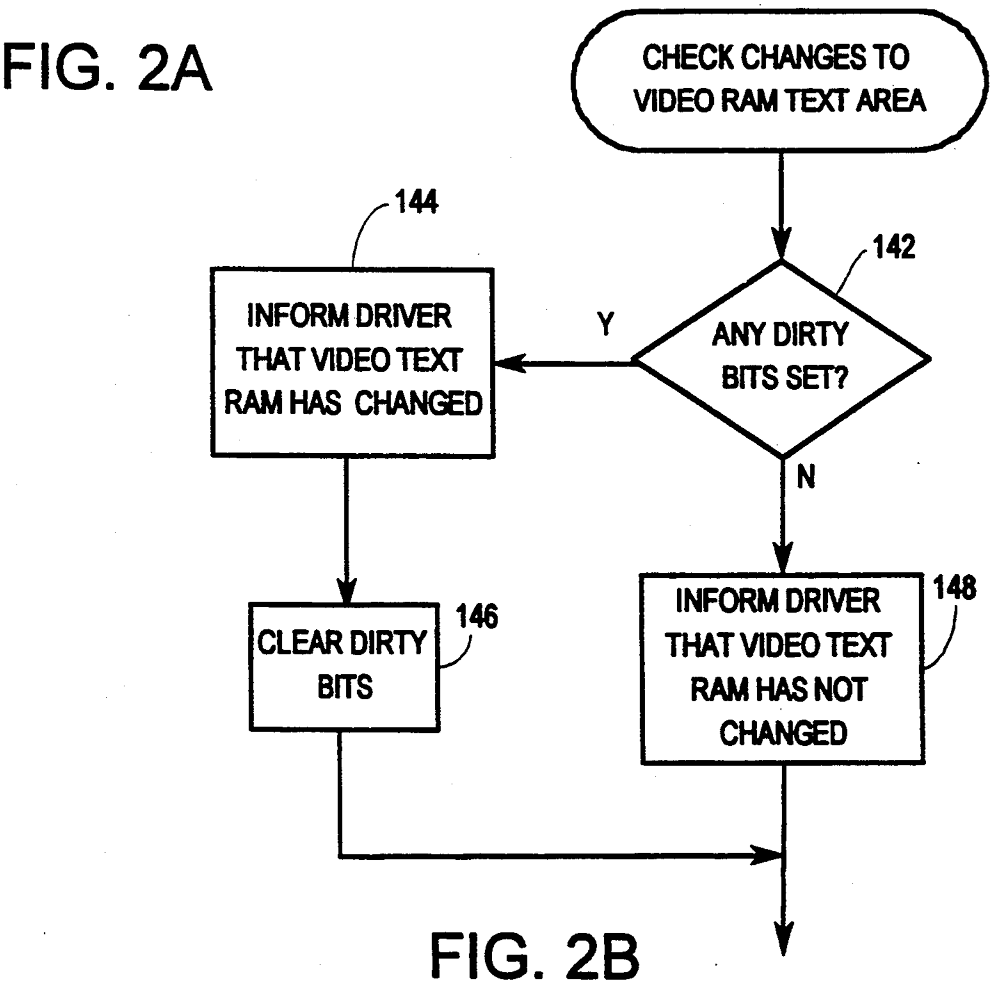
Figure 6:
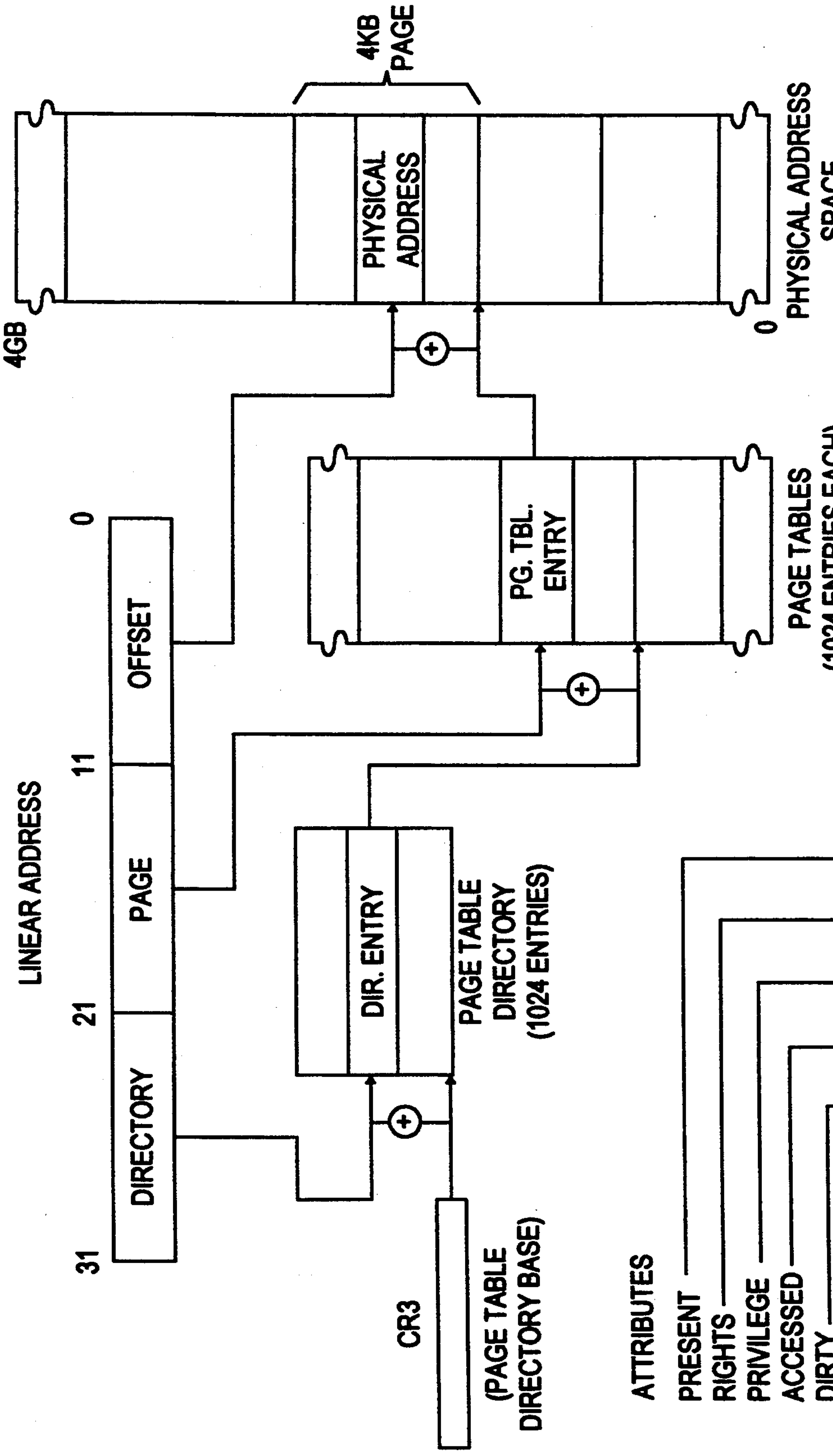
FIG. 6 a diagram of address translation, or mapping, in an 80386 microprocessor used in an embodiment of the invention.
Figure 7:
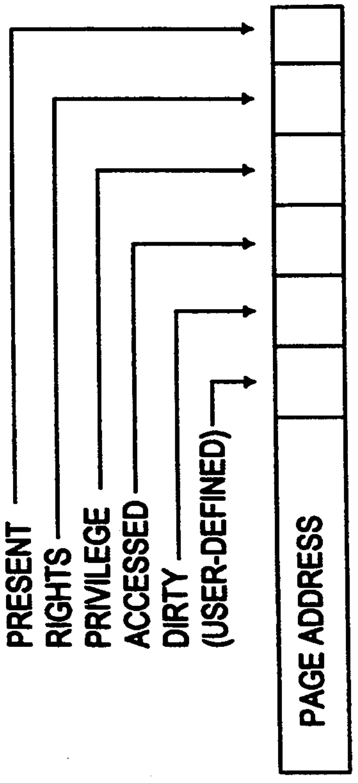
FIG. 7 is a diagram of the contents of a page table entry used in the address translation of FIG. 6.

Referring now to FIG. 2B, when the driver requests the memory management software to check if any writes occurred to the video text RAM area, the memory management software checks the dirty bits for the pages corresponding to the text RAM area in step 142. Such a dirty bit is illustrated in FIG. 7, which is a page table entry as illustrated in FIG. 6. If any of the dirty bits are set, the memory management software informs the driver that the video text RAM has changed in step 144. In step 146, the memory management software clears all of the dirty bits for these pages so that subsequent determinations can be made. If none of the dirty bits are set, then the memory management software informs the driver that the video text RAM has not changed in step 148. From steps 146 or 148, the routine then returns to the timer interrupt routine at step 150.

Referring again to FIG. 3, if the memory management software informs the driver that the video text RAM has not changed since the last timer interrupt in step 126, then the driver proceeds to step 134 and executes other functions which must be performed at each timer interrupt. If the memory management software informs the driver that the video text RAM has changed since the last timer interrupt in step 126, then in step 128 the driver retrieves the new text data or ASCII data from the video text RAM. This retrieval from inside the 4 k page can be done several different ways. One way is to keep a copy of the previous text RAM area data in another location and compare the two areas. Any differences are the new text data and are copied into the shadowing location to allow a comparison on the next pass. In an alternative, the text RAM area can be kept set at an illegal value then scanned for any different values. These different values would be the new data. The driver would then note the value and location, reset the text RAM area location to the preset value, and instruct the memory management software to clear the dirty bit set because of the resetting write operations. In a third alternative, the driver could simply consider all non-preset values to be new data. In step 130, the driver converts the text data from ASCII format to a graphics mode or pixel format. In step 132, the driver displays the characters on the video screen 68 and proceeds to step 134 to continue with timer interrupt functions. This cycle repeats for each timer interrupt, preferably every 16.67 milliseconds.

Therefore, all U.S. application software and TSRs can be executed under DOS/V operating in Japanese mode. In addition, because U.S. software application can now be run in Japanese mode, a user can input Japanese characters using either of the phonetic written languages katakana or hiragana, or using English characters, i.e., romaji, from the keyboard while U.S. software is executing. These Japanese characters will be passed on to the software application. The software will think it is dealing with ASCII codes, even though it is dealing with the double byte codes associated with Japanese characters. Japanese computers include a software routine referred to as a front end processor which converts these double byte codes into kanji characters. Since double byte codes will be printed on the monitor screen 68 as kanji characters, a user can input and see Japanese characters on the screen while executing a U.S. software application.

Therefore, a method for emulating text mode in Japanese mode for U.S. software applications is disclosed. U.S. software applications which write directly to the video text RAM areas can now operate under Japanese mode. Thus, a user is no longer required to exit Japanese mode and enter U.S. mode before executing a U.S. software application.

The foregoing disclosure and description of the invention are illustrative and explanatory thereof, and various changes in the methods, algorithms, or steps may be made without departing from the spirit of the invention.

We claim:

1. A method for allowing software requiring a computer system having a video text mode to operate in a target computer system including a video controller operating in graphics mode, the target computer system also including main memory a video monitor, and a processor which implements a paging mechanism, the paging mechanism including values for pages corresponding to areas of memory indicative of whether data has been written to the pages, the method comprising the target computer system implemented steps of:

mapping main memory to define a video text area of main memory;

periodically determining if text data has been written to said video text area of main memory after said step of mapping by checking values for pages corresponding to said video text area of main memory; and creating graphics mode characters on said video monitor based on said written text data if text data has been written to said video text area of main memory since a previous operation of said step of periodically determining.

2. The method of claim 1, wherein the target computer system includes a timer which generates periodic interrupts;

wherein said step of periodically determining executes after each of the periodic interrupts.

3. The method of claim 1, wherein the target computer system includes a processor, wherein said step of mapping includes reserving 32 kbytes of memory and mapping processor addresses beginning at address B8000H to said reserved 32 kbytes of memory.

4. The method of claim 1, wherein the video controller also includes a text/graphics mode wherein the video controller can operate in either text mode or graphics mode, wherein a user can switch between graphics mode and text/graphics mode, the method further comprising the target computer system implemented step of:

disabling said mapping of said video text area memory when the video controller enters text/graphics mode.

5. The method of claim 1, wherein said text data comprises ASCII data.

6. A method for allowing software requiring a computer system having a video text mode to operate in a target computer system including a video controller operating in graphics mode, the target computer system also including main memory, a video monitor, and a processor which implements a paging mechanism, the paging mechanism including values for pages corresponding to areas of memory indicative of whether data has been written to the pages, the method comprising the target computer system implemented steps of:

mapping main memory to define a video text area of main memory;

periodically determining if text data has been written to said video text area of main memory after said step of mapping by checking values for pages corresponding to said video text area of main memory;

clearing said values for pages corresponding to said video text area of main memory after said step of periodically determining if text data has been written to said video text area of main memory; and creating graphics mode characters on said video monitor based on said written text data if text data has been written to said video text area of main memory since a previous operation of said step of periodically determining.

7. A method for allowing software requiring a computer system having a video text mode to operate in a target computer system including a video controller operating in either text mode or graphics mode, wherein a user can switch between graphics mode and text/graphics mode, the target computer system also including main memory and a video monitor, and wherein the target computer system is executing DOS/V in Japanese mode when the video controller is in graphics mode and the target computer system is executing DOS/V in U.S. mode when the video controller is in text/graphics mode, the method comprising the target computer system implemented steps of:

mapping main memory to define a video text area of main memory;

periodically determining if text data has been written to said video text area of main memory after said step of mapping;

creating graphics mode characters on said video monitor based on said written text data if text data has been written to said video text area of main memory since a previous operation of said step of periodically determining; and disabling said mapping of said video text area of main memory when the video controller enters text/-graphics mode.

8. A method for allowing software requiring a computer system having a video text mode to operate in a target computer system including a video controller operating in graphics mode, the target computer system also including main memory and a video monitor, the method comprising the target computer system implemented steps of:

mapping main memory to define a video text area of main memory;

periodically determining if text data has been written to said video text area of main memory after said step of mapping;

creating graphics mode characters on said video monitor based on said written text data if text data has been written to said video text area of main memory since a previous operation of said step of periodically determining; and determining if a user selected text conversion option has been selected prior to said step of mapping, wherein said step of mapping, said step of periodically determining, and said step of creating are only executed if said text conversion option has been selected.

* * * * *

UNITED STATES PATENT AND TRADEMARK OFFICE

CERTIFICATE OF CORRECTION

PATENT NO. : 5,404,438

DATED : April 4, 1995

INVENTOR(S) : John R. Kennedy et al.

It is certified that error appears in the above-identified patent and that said Letters Patent is hereby corrected as shown below:

In col. 7, line 48, after "memory" please insert --,--.

Signed and Sealed this

Twentieth Day of June, 1995

Attest:

BRUCE LEHMAN

*Attesting Officer* *Commissioner of Patents and Trademarks*